United States Patent [19]

Sato

[11] 4,150,405
[45] Apr. 17, 1979

[54] REMOTE CONTROL DEVICE FOR AUTOMATIC TELEPHONE ANSWERING SYSTEM

[75] Inventor: Takashi Sato, Kawagoe, Japan

[73] Assignee: Pioneer Electronic Corporation, Tokyo, Japan

[21] Appl. No.: 861,323

[22] Filed: Dec. 16, 1977

[30] Foreign Application Priority Data

Dec. 28, 1976 [JP] Japan .................................. 51/157493

[51] Int. Cl.² ...................... G11B 15/18; G11B 19/06; H04M 1/64
[52] U.S. Cl. .................. 360/72.3; 179/6 R; 179/6 E; 360/74.1
[58] Field of Search ....................... 360/72, 71, 73, 74, 360/137; 179/100.1 DR, 6 E, 6 R

[56] References Cited

U.S. PATENT DOCUMENTS

| | | | |
|---|---|---|---|
| 3,541,271 | 10/1967 | Joslow et al. | 360/71 |
| 3,681,523 | 8/1972 | Sidline | 360/72 |
| 3,703,774 | 11/1972 | Goshima | 360/74 |
| 3,730,997 | 5/1973 | Konno | 179/6 E |
| 3,894,188 | 7/1975 | Konno | 179/6 E |
| 3,903,369 | 9/1975 | Darwook | 179/6 E |
| 3,999,016 | 12/1976 | Ueda et al. | 179/6 E |

Primary Examiner—Alfred H. Eddleman
Attorney, Agent, or Firm—Sughrue, Rothwell, Mion, Zinn and Macpeak

[57] ABSTRACT

An automatic telephone answering system of the accumulating type is disclosed wherein only newly recorded messages on the message recording tape are remotely reproduced with accuracy. A pulse generator is driven by a reel shaft to generate pulses in proportion to the rotation of the reel shaft. A first counter counts the number of pulses from the pulse generator whenever a message is recorded or reproduced. A second counter counts the number of pulses from the pulse generator when the message tape is rewound in response to a remote control signal. A comparator compares the counts accumulated in the first and second counters to control the rewinding, reproducing and standby modes of the system after a remote control signal is received.

1 Claim, 1 Drawing Figure

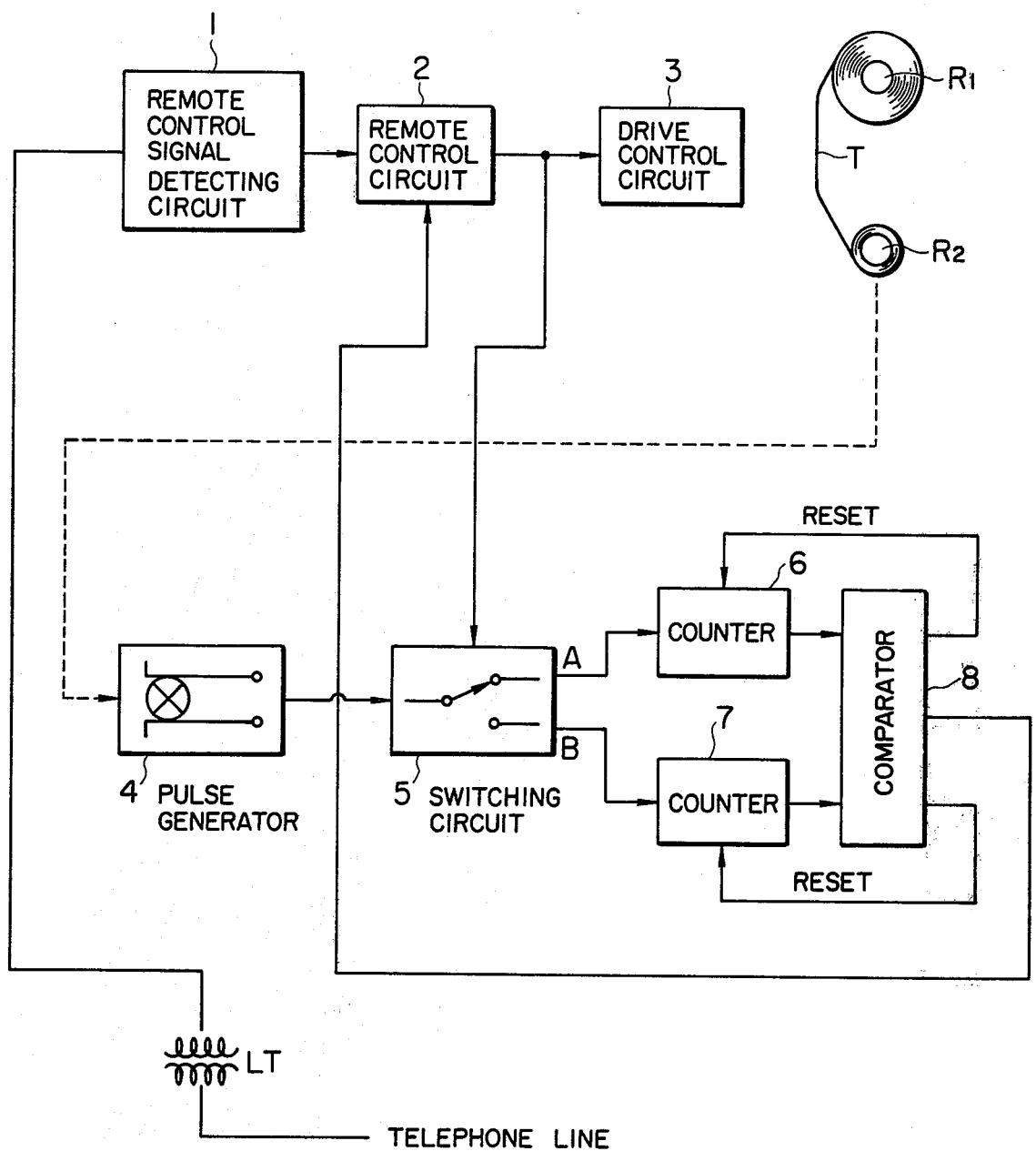

REMOTE CONTROL DEVICE FOR AUTOMATIC TELEPHONE ANSWERING SYSTEM

BACKGROUND OF THE INVENTION

This invention relates to an automatic telephone answering system in which a calling party's message recorded on the message recording tape can be remotely reproduced, and more particularly to a remote control device for such an automatic telephone answering system of the accumulating type in which only newly recorded messages on the message recording tape are remotely reproduced with accuracy.

Remote control devices of this type can be roughly divided into systems, an erasing system and an accumulating system. In the erasing system, no matter how many times the automatic telephone answering system is remotely operated, the message recording tape is returned to its initial position to be in a standby mode at the end of the remote operation. Therefore, in this system, only newly recorded messages on the tape can be reproduced whenever it is remotely operated. However, whenever the remote reproduction of a message is effected, the calling party's message which has been recorded is erased, and accordingly it is impossible to reproduce that message again. On the other hand, in the accumulating system, the amount of rewinding the tape is determined by a period of time during which a remote control signal is continuously transmitted to the system. Accordingly, the user must determine the amount of rewinding of the tape by guess. That is, to distinguish the part of the tape which has been reproduced before from the new part of the tape which is to be reproduced, he employs a method in which after the tape is subjected to trial reproduction, the tape is rewound by the remote control signal again. Thus, the accumulating system is disadvantageous in that the remote reproduction is rather troublesome and inaccurate.

SUMMARY OF THE INVENTION

In view of the above-described difficulties accompanying the conventional remote control systems, an object of this invention is to provide an automatic telephone answering system in which the calling party's message which has been recorded is not erased no matter how many times remote reproduction is repeated, and only a newly recorded calling party's message is reproduced for the owner in response to a remote control signal.

BRIEF DESCRIPTION OF THE DRAWING

In the drawing, the sole FIGURE is a block diagram of the preferred embodiment of the present invention.

DESCRIPTION OF THE PREFERRED EMBODIMENT

Now, one example of the automatic telephone answering system according to this invention will be described with reference to the accompanying drawing. A line transformer LT is connected with the primary side to a telephone line, and a remote control signal detecting circuit 1 is connected to the secondary side of the line transformer LT. This remote control signal detecting circuit 1 comprises a filter allowing a remote control signal of the order of 1 KHz to pass. The output of the circuit 1 is connected to a remote control circuit 2. This remote control circuit 2 comprises a bistable multivibrator which is triggered by the output of the remote control signal detecting circuit 1. A tape drive control circuit 3 is energized by the output of the bistable multivibrator so as to be in a rewinding mode. A message recording tape T is wound on reels $R_1$ and $R_2$. A pulse generating circuit 4 is connected to the shaft of reel $R_2$, for example, and generates pulses in proportion to the rotation of the shaft of reel $R_2$. Connected to the output of the pulse generating circuit 4 is an input switching circuit 5. This input switching circuit 5 is controlled by the output of the above-described remote control circuit 2 in such a manner that when the tape transport is in the message recording mode or in the message reproducing mode, the output of the pulse generating circuit 4 is applied to the output terminal A of the input switching circuit 5, and when the tape transport is in the rewinding mode, the output of the pulse generating circuit 4 is applied to the output terminal B. A first counter 6 is connected to the terminal A. This first counter operates to count the output of pulse generating circuit 4 when a message is recorded. A second counter 7 is connected to the terminal B. This second counter operates to count the output of the pulse generating circuit 4 when the tape is rewound. A comparator 8 is adapted to compare the count accumulated in the first counter 6 with the count accumulated in of the second counter 7. When the count accumulated in the two counters 6 and 7 are equal, the comparison circuit 8 delivers a trigger signal to the remote control circuit 2 and reset signals to the counters 6 and 7.

The operation of the automatic telephone answering system according to this invention will now be described. In general, in an automatic telephone answering system, for instance as disclosed by U.S. Pat. No. 3,730,997, when a calling signal from a calling party is received, the starting circuit is operated, as a result of which the message tape is run to inform the calling party that the called party is absent. Then, the message recording tape T is driven to record the message from the calling party, and simultaneously the pulse generating circuit 4 generates an output which is applied to the first counter 6 by means of the input switching circuit 5. Accordingly, a count is accumulated in counter 6 which corresponds to a period of time during which the calling party's message is recorded. If a remote control signal is received, the remote control signal is detected by the remote control signal detecting circuit 1 thereby to trigger the remote control circuit 2, whereupon a signal is applied to the tape drive control circuit 3 by the remote control circuit 2 to place the message recording tape transport in the rewinding mode. At the same time, a signal from the remote control circuit 2 is applied to the input switching circuit 5 so as to apply the output of the pulse generating circuit 4 to the second counter 7. Thus, the number of pulses corresponding to the amount of rewinding of the message recording tape T is counted by the second counter 7. The counts accumulated in the two counters 6 and 7 are compared in the comparator 8. When the two count values are equal, the comparator 8 applies a reset signal to the first counter 6 so that the first counter 6 is reset to an initial state, while a trigger signal is applied to the tape drive control circuit 3 by the remote control circuit 2, as a result of which the mode of the tape transport is switched over to the message reproducing mode from the tape rewinding mode. Simultaneously, a trigger signal is applied to the input switching circuit 5 by remote control circuit 2 so that the pulses from the pulse generating circuit 4 are applied to the first counter 6 again. Therefore, as the message on the tape T is reproduced, the first counter 6 accumulates a count corresponding to the number of pulses from the pulse generating circuit. When the count accumulated in the first counter 6 equals the count accumulated in the second counter 7, the comparator 3 provides its output again. As a result, the first and second counters 6 and 7 are reset, while a trigger signal is applied to the remote control circuit 2 and thereby cause the tape transport to be switched to the standby mode. Thus, all of the operations of the system have been completed, and the system is ready for the next calling party.

As is apparent from the above description, in the system according to this invention, whenever the system is subjected to remote operation, the first and second counters are reset. The number of pulses corresponding to the length of a message from a calling party which is recorded thereafter is counted by the first counter. When the tape is rewound for remote reproduction, the number of pulses corresponding to the amount of rewinding the tape is counted by the second counter, and when the count accumulated by the second counter equals the count accumulated in the first counter, the state of the tape transport is switched over to the message reproducing mode from the tape rewinding mode. Therefore, the newly recorded message can be accurately reproduced. It is another advantage of this invention that unlike the conventional automatic telephone answering systems, the messages previously reproduced are not erased. Thus, according to this invention, reliability of the automatic telephone answering system is remarkably improved.

What is claimed is:

1. In an automatic telephone answering system of the accumulating type which comprises a remote control signal detecting circuit connected to a telephone line and responsive to a remote control signal for producing an output signal, a remote control circuit connected to said remote control signal detecting circuit and responsive to the output signal therefrom for producing a control signal, and a drive control circuit connected to said remote control circuit for controlling the recording, rewinding, reproducing and standby modes of a tape transport, the improvement wherein said automatic telephone answering system further comprises:

pulse generating means driven by said tape transport to generate pulses in proportion to the tape movement by said tape transport, a first counter for counting the number of pulses generated by said pulse generating means, a second counter for counting the number of pulses generated by said pulse generating means, switching means connected between said pulse generating means and said first and second counters and responsive to the control signal from said remote control circuit for switching the pulses generated by said pulse generating means between said first and second counters, said first counter counting pulses when said tape transport is in either recording or reproducing modes and said second counter counting pulses when said tape transport is in the rewinding mode, and comparator means connected to the output of said first and second counters for comparing the respective counts accumulated therein, said comparator means producing an output to said remote control circuit and a reset signal to said first counter when the count accumulated in said second counter becomes equal to the count accumulated in said first counter and further producing an output to said remote control circuit and reset signals to both said first and second counters when the count accumulated in said first counter becomes equal to the count accumulated in said second counter.

* * * * *